No. 804,055. PATENTED NOV. 7, 1905.
W. H. SANDIFUR.
CORN PLANTER.
APPLICATION FILED SEPT. 17, 1904.
2 SHEETS—SHEET 2.
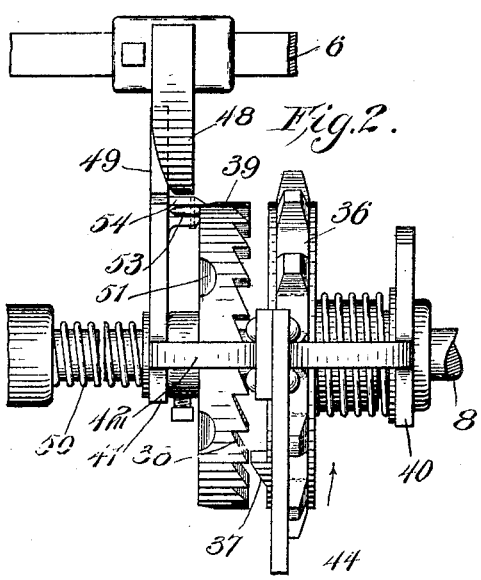
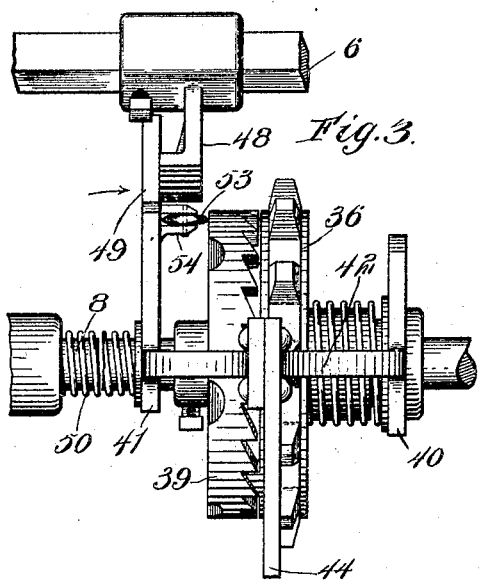
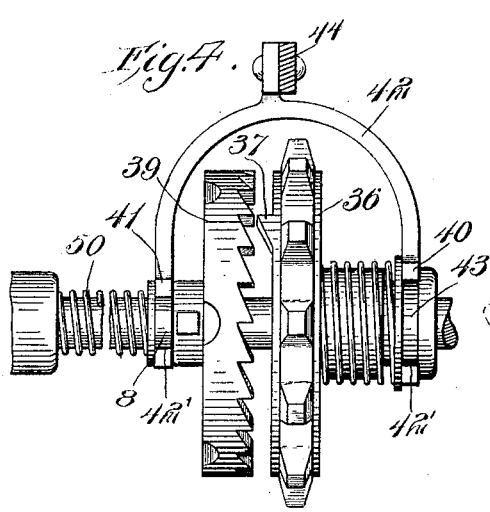
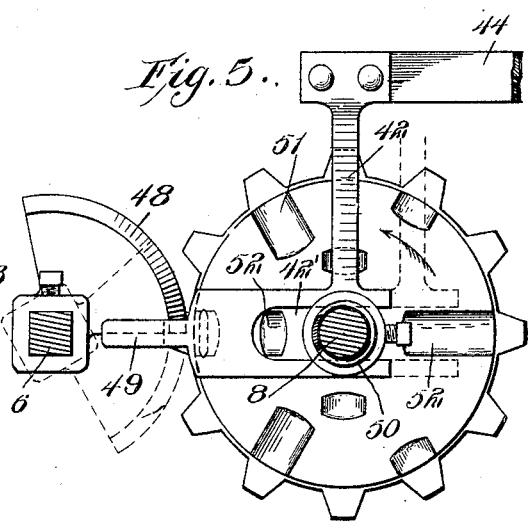
Witnesses:
Louis D. Heinrichs
F. S. Elmore
Inventor
William H. Sandifur
By Victor J. Evans
Atty.

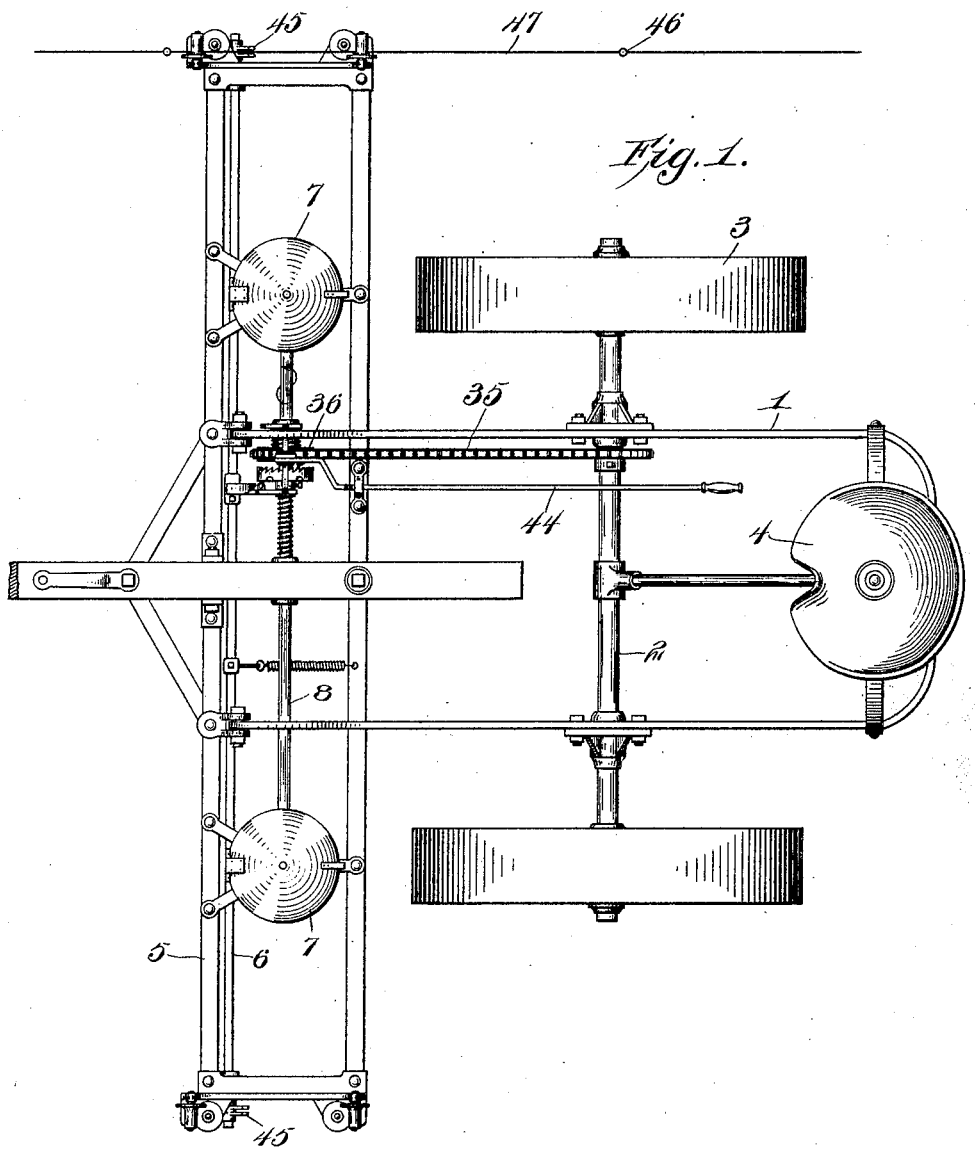

UNITED STATES PATENT OFFICE.

WILLIAM H. SANDIFUR, OF BOWLING GREEN, OHIO, ASSIGNOR OF ONE-HALF TO NOAH E. MEREDITH, OF INDIANAPOLIS, INDIANA.

CORN-PLANTER.

No. 804,055.  Specification of Letters Patent.  Patented Nov. 7, 1905.

Application filed September 17, 1904. Serial No. 224,816.

*To all whom it may concern:*

Be it known that I, WILLIAM H. SANDIFUR, a citizen of the United States, residing at Bowling Green, in the county of Wood and State of Ohio, have invented new and useful Improvements in Corn-Planters, of which the following is a specification.

This invention relates to planters designed especially for planting corn or the like, and has for its primary objects to provide an improved mechanism whereby the dropper-shaft will be set in motion at predetermined intervals and be driven during certain periods of time and one wherein the intervals of time elapsing between the movements of the shaft may be varied at will to regulate the distances between the planted hills.

With these and other objects in view the invention comprises the novel features of construction and combination of parts more fully hereinafter described.

In the accompanying drawings, Figure 1 is a top plan view of a planter embodying the invention. Fig. 2 is a plan view, on an enlarged scale, of the clutch mechanism and attendant parts, showing the same in inactive position. Fig. 3 is a similar view showing the clutch in active position. Fig. 4 is an elevation of the clutch mechanism as viewed in the direction of the arrow in Fig. 2, and Fig. 5 is a side elevation of the same viewed in the direction of the arrow in Fig. 3.

Referring to the drawings, 1 designates the main frame of the machine, sustained by an axle 2 and transporting-wheels 3 and provided at its rear end with a seat 4 and at its forward end with a transversely-disposed secondary frame 5, having journaled therein a rock-shaft 6, the frame 5 being also adapted to support the seed-hoppers 7, between which extends a rotary operating-shaft 8.

The rotary operating-shaft 8 is driven from the axle 2 by means of a chain 35, engaged with a suitable sprocket-wheel on the axle and with a sprocket-wheel 36, mounted idly upon the shaft 8 and adapted for a slight amount of movement or play longitudinally of the latter, the sprocket 36 being provided with a lateral projection or tooth 37, formed for engagement with the teeth 38 of a clutch member or disk 39, fixed upon and for rotation with the shaft 8. The sprocket 36 and clutch member 39, which normally stand in non-engaging position, as illustrated in Figs. 8 and 10, are arranged between the spaced side arms or portions 40 41 of a substantially U-shaped movable element or yoke 42, which straddles the clutch and sprocket, the side portions or arms of the yoke being slotted longitudinally, as at 42', to receive the shaft 8 and hub 43 of the sprocket and to permit sliding movement of the yoke 42 in a direction longitudinally of the main frame 1 for a purpose which will hereinafter appear, this longitudinal movement being effected through the medium of an operating rod or element 44, having at its rear end a suitable handpiece within convenient reach from the seat 4.

The rock-shaft 6 is provided at its end with appropriate forks 45, adapted for engagement by stops or buttons 46, arranged at spaced intervals on a check line or wire 47 of the usual construction, whereby the shaft 6 will be rocked at intervals in the ordinary manner during the passage of the machine over the field, and upon the shaft 6 is fixed a cam head or member 48, adapted, when the shaft is rocked, to act upon an arm or extension 49, carried by the arm 41 of the yoke to move the latter transversely against the action of a spring 50 on the shaft 8, and thereby move the sprocket 36 to bring its tooth 37 into clutched engagement with the teeth of the head 39, it being understood, of course, that during such engagement of the parts the shaft 8 will be rotated, owing to the fixed engagement of the clutch therewith.

The clutch-head 39 has formed upon its outer side opposite the teeth 38 a series of concentric rows of radial depressions 51 and 52, these depressions being adapted to receive a small antifriction bearing-roller 53, journaled for rotation in a suitable bearing-bracket 54, projected laterally from the inner face of the arm 41. In practice the bearing-roller 53 normally seats in one of the depressions 51 52, and when so seated the spring 50 will serve to move the yoke 42 laterally a sufficient distance to maintain the sprocket 36 out of engagement with the clutch; but when the yoke is acted upon through the cam member 48, as heretofore explained, the roller will be forced out of its seat in the depression and caused during rotation of the shaft 8 to travel on the face of the clutch 39 until it reaches and enters a second depression, whereupon the spring 50 will again act to move the yoke to normal position and carry the sprocket 36 out of engagement with the clutch, whereupon the rotation of the shaft 8 will of course cease. Thus it will be seen that the intervals of time during which the shaft rotates will be governed by the distances between the depressions and that inasmuch as the depressions 51 of the outer row are a greater distance apart than those 52 of the inner row the length of time during which the shaft rotates may be changed by causing the roller 53 to act in conjunction with either row of depressions. This latter action may be effected by moving the operating-rod 44 back and forth to thereby move the head 42 in a direction longitudinally of the frame 1, as heretofore stated, this movement being possible owing to the arms 40 41 having the slots 42', which receive the shaft, as seen more clearly in Fig. 11.

It is to be particularly noted that certain of the depressions 51 are of a greater length than the others and that these long and short depressions alternate, whereby a certain movement of the yoke member will cause the roller 53 to move out of register with the shorter depressions and act only in conjunction with the longer depressions, and thus impart to the shaft a longer interval of rotation, whereas a further movement of the yoke brings the roller 53 into register with the inner row of depressions 52 and again imparts to the shaft short periods or intervals of rotation.

It is apparent from the foregoing that in the general operation of the device the shaft 6 will be rocked at intervals, owing to the passage of the buttons or checks 46 through the forks 45, and thereby through the medium of the cam member 48 move the sprocket 36 into engagement with the clutch 39 for imparting rotary motion to the operating-shaft 8 and through the medium of the latter to the dropping-ring 9, and, further, that the amount of rotation of the shaft, and consequently of the dropping-ring, will be governed by the action of the roller 53 in conjunction with the depressions, as heretofore stated, this latter action being under thorough and positive control of the operator through the medium of the rod or element 44.

In my copending application, filed July 1, 1904, Serial No. 214,943, I have disclosed a specifically different clutch mechanism, and the claims in said application are directed to the specific form of said clutch mechanism and a particular combination of the clutch mechanism and seed-dropping devices, while the claims of the present application are generic to both forms of clutch and specific to that form disclosed herein.

From the foregoing it will be seen that I produce a comparatively simple and efficient mechanism admirably adapted for the attainment of the ends in view, it being understood that minor changes in the details herein set forth may be resorted to without departing from the spirit of the invention.

Having thus fully described the invention, what is claimed as new is—

1. In a device of the class described, a seed-box, means including a rotary operating-shaft for discharging seed therefrom, a driving-gear mounted idly upon the shaft and adapted for movement longitudinally thereof, a clutch fixed upon the shaft and designed for engagement with the gear, said clutch being provided with a series of spaced depressions, a yoke movable longitudinally of the shaft for moving the gear into engagement with the clutch and having a projecting arm, a rock-shaft, means for actuating the same, a cam member carried by the rock-shaft and adapted to act upon the projecting arm for moving the yoke and gear to active position, and a roller carried by the arm and designed to normally seat in one of the depressions in the clutch, said roller being adapted, when the yoke is operated, to travel upon the face of the clutch and to maintain the gear in engagement with the latter during the intervals of space between the depressions.

2. In a device of the class described, a seed-dropping mechanism including a rotary operating-shaft, a clutch fixed upon the shaft and provided in one of its faces with a plurality of spaced depressions, a rock-shaft, means for operating the same, a yoke movable longitudinally of the operating-shaft and operable from the rock-shaft, a roller carried by the yoke and adapted to normally seat within one of the depressions and when the yoke is operated to ride upon the adjacent face of the clutch, and a driving-pulley mounted idly upon the operating-shaft for movement longitudinally thereof, said pulley being movable by the yoke into engagement with the clutch and adapted to remain in such engagement during the travel of the roller between a pair of the depressions.

3. In a device of the class described, a drive-shaft, a driving-pulley mounted idly on the shaft and for movement longitudinally thereof, a clutch member fixed on the shaft and provided in one face with a series of depressions, a yoke operable for moving the pulley into engagement with the clutch and having a roller designed to normally seat in one of the depressions, and means for moving the yoke, said roller being adapted, when the yoke is moved, to override the face of the clutch between a pair of the depressions and maintain the pulley in engagement with the clutch.

4. In a device of the class described, a drive-shaft, a drive-pulley mounted idly thereon and for movement longitudinally of the shaft, a clutch fixed on the shaft and having a plurality of rows of depressions, the depressions in one row being spaced greater intervals apart than those in another, a member movable longitudinally of the shaft for moving the drive-pulley into engagement with the clutch, means for actuating the member, a roller carried by the member and adapted to normally seat in one of the depressions and to override the adjacent face of the clutch for maintaining the pulley in engagement with the latter, said member being movable also transversely of the shaft for bringing the roller into register with the respective rows of depressions, and means for moving the member for the last-named purpose.

5. In a device of the class described, a dropper mechanism including a rotary operating-shaft, a fixed clutch member on the shaft, a drive member mounted idly on the shaft and for movement longitudinally thereof, means for moving the drive member into engagement with the clutch member, and means for maintaining said parts in such engagement for predetermined intervals.

6. In a device of the class described, a dropper mechanism including a rotary shaft, a fixed clutch member on the shaft, a drive member mounted idly on and for movement longitudinally of the shaft, means for moving the drive member into engagement with the clutch member, means for maintaining the parts in such engagement during predetermined intervals, and means for automatically moving the drive member to inactive position when released.

7. In a device of the class described, a dropper mechanism including a rotary shaft, a fixed clutch member on the shaft, a drive member mounted idly on and for movement longitudinally of the shaft, means for moving the drive member into engagement with the clutch to rotate the shaft, means for maintaining the parts in such engagement during predetermined intervals of time, and means for changing at will the intervals of engagement of the parts.

8. In a device of the class described, a dropping mechanism including a rotary shaft, a clutch member fixed on the shaft, a drive member mounted idly and for movement longitudinally of the shaft, means for moving the drive member into engagement with the clutch for rotating the shaft, means for maintaining the parts in such engagement during predetermined intervals of time, means for automatically returning the drive member to inactive position when released, and means under control of the operator for varying at will the intervals of such engagement.

9. In a device of the class described, a rotary operating-shaft, a clutch member fixed thereon and provided with a plurality of depressions, a drive member mounted idly on the shaft, a movable element adapted for maintaining the clutch and drive members in operative engagement during predetermined intervals, and a roller carried by the element and designed to coöperate with said depressions for actuating the element.

10. In a device of the class described, a rotary operating-shaft, a clutch member mounted thereon and provided with a plurality of depressions, a drive member mounted idly on the shaft, means including a movable element for maintaining the drive member in operative engagement with the shaft during predetermined intervals, and a roller carried by the element and adapted for coöperation with the depressions to actuate the element.

11. In a device of the class described, a rotary operating-shaft, a clutch member fixed thereon and provided with a plurality of depressions, a drive member mounted idly on the shaft, a movable element, and a roller carried by the element and designed to alternately seat in and override the surface of the clutch between the depressions for maintaining the clutch and drive members in operative engagement during predetermined intervals.

12. In a device of the class described, a rotary operating-shaft, a drive member mounted idly thereon, a clutch member fixed on the shaft, and a movable element operable at predetermined intervals for operatively engaging the clutch and drive members, said clutch member and element being provided one with a plurality of depressions and the other with a projecting portion adapted to coöperate with said depressions for actuating the element.

13. In a device of the class described, a rotary operating-shaft, a clutch member mounted thereon and provided with a plurality of depressions, a drive member mounted idly on the shaft, means including a movable element for operatively engaging the drive member and shaft during predetermined intervals, and a roller carried by the element and coöperating with the depressions to actuate the element.

14. In a device of the class described, a rotary operating-shaft, a drive member mounted idly thereon, and means including a clutch member and movable element for operatively engaging the drive member and shaft at predetermined intervals, said clutch member and element being provided one with a plurality of depressions and the other with a projecting portion adapted to alternately seat in and override the surface between said depressions for actuating the element.

In testimony whereof I affix my signature in presence of two witnesses.

WILLIAM H. SANDIFUR.

Witnesses:
ROBERT DUNN,
N. E. MERIDETH.